United States Patent [19]

Gille et al.

[11] Patent Number: 4,992,671
[45] Date of Patent: Feb. 12, 1991

[54] CIRCUIT ARRANGEMENT FOR AT LEAST ONE ELECTRIC LOAD OF A MOTOR VEHICLE

[75] Inventors: Gunther Gille, Sersheim; Horst Goertler, Sachsenheim; Horst Rachner, Bietigheim-Bissingen, all of Fed. Rep. of Germany

[73] Assignee: SWF Auto-Electric GmbH, Bietigheim-Bissingen, Fed. Rep. of Germany

[21] Appl. No.: 168,118
[22] PCT Filed: May 6, 1987
[86] PCT No.: PCT/DE87/00199
§ 371 Date: Sep. 6, 1988
§ 102(e) Date: Sep. 6, 1988
[87] PCT Pub. No.: WO87/06898
PCT Pub. Date: Nov. 19, 1987

[30] Foreign Application Priority Data

May 7, 1986 [DE] Fed. Rep. of Germany ....... 3615531

[51] Int. Cl.[5] .............................................. H02G 3/00
[52] U.S. Cl. ............................ 307/10.1; 318/DIG. 2
[58] Field of Search ................. 307/9.1, 10.1; 318/281, 318/443, 444, DIG. 2, 466, 484

[56] References Cited

U.S. PATENT DOCUMENTS

| 4,288,705 | 9/1981 | Barske | 307/10.1 |
| 4,328,431 | 5/1982 | Usami | 307/10.1 |
| 4,375,610 | 3/1983 | Nagaoka et al. | 307/10.1 |

FOREIGN PATENT DOCUMENTS

| 3008580 | 9/1981 | Fed. Rep. of Germany . |
| 3047453 | 7/1982 | Fed. Rep. of Germany . |

Primary Examiner—A. D. Pellinen
Assistant Examiner—Jeffrey A. Gaffin
Attorney, Agent, or Firm—Robert P. Seitter; J. Gordon Lewis

[57] ABSTRACT

A circuit arrangement for at least one electric load of a motor vehicle such as a windshield wiper system is disclosed, in which the switching signals of an operating switch of the system are in a coded manner transmitted to a programming unit which a detector with several ranges of detection for the various coded switching signals. The detector has additional ranges of detection for switching signals not associated with particular modes of operation, so that troubles in the system can be recognized by the detector in the programming unit providing for improved system operational reliability.

17 Claims, 4 Drawing Sheets

CIRCUIT ARRANGEMENT FOR AT LEAST ONE ELECTRIC LOAD OF A MOTOR VEHICLE

BACKGROUND OF THE INVENTION

This invention relates to a circuit arrangement for use with at least one electric accessory load of a motor vehicle.

In modern motor vehicles; the number of electrically operated accessories defining electrical loads and the number of modes of operation of the various loads in a motor vehicle have been considerably increased. For example, typically four modes of operation are provided for the wiper motor of a motor vehicle windshield cleaning system. Namely one mode of operation is for the parking position run of the wiper motor, one mode of operation for slow wiper speed, one for a fast wiper speed and a so-called intermittent mode of operation in which the wiper motor is stopped for a defined period of time after each winding cycle. To some windshield cleaning systems this delay or interval time is firmly and invariably predetermined. In other windshield cleaning systems the interval time can be continuously adjusted through a potentiometer.

This interval time can also be made variable in several steps, wherein, instead of the potentiometer, different fixed resistors are connected with a timing element. In a windshield cleaning system of this kind several different modes of intermittent operation may be achieved through an operating switch. Thus, in a system of this kind the operating switch has several operating positions for the various modes of operation, wherein the different switching signals of the operating switch are conducted to a programming unit which determines the mode of operation determined by the operating switch. In today's windshield cleaning systems an expensive cable with a number of switching signal transmission paths or leads corresponding to the number of different modes of operation is necessary to transmit the switching signal of the operating switch to the programming unit. It can easily be seen that the costs for this lead will increase with the number of different modes of operation. In order to reduce costs circuit arrangements have been devised in which different voltage levers corresponding to the various operating positions are switched onto a switching signal transmission path or lead by the operating switch, and the programming unit has a detector with ranges of detection associated with the different voltage levels and accordingly determines the mode of operation. A circuit arrangement of this kind which includes only one switching signal transmission path between the operating switch and the programming unit is, for example, disclosed the German specification No. DE OS 2,944,224. The amount of circuitry between the operating switch and the programming unit can be reduced considerably by a construction of this kind. It is true, however, that a circuit arrangement of this kind does not always operate reliably. For example, if a short-circuit of the switching signal transmission path or of the input of the programming unit with one or the other poles of the voltage source occurs a voltage level is provided at the input of the programming unit which corresponds with a voltage level of one of the modes of operation. Consequently, the windshield cleaning system can be inadvertently put into operation or a particular unwanted mode of operation can be switched on. A similar fault can also occur during a changeover of the operating switch from one mode of operation to another, because during this period of time no defined potential is switched onto the lead to the programming unit.

SUMMARY OF THE INVENTION

Thus, the present invention is directed to improving the operational reliability of a circuit arrangement of this kind.

The invention is based on the premise that faulty conditions, e.g., short-circuits, or such conditions which appear compulsorily, but cannot be associated with any particular mode of operation, can be clearly recognized and evaluated when the detector of a programming unit is formed in such a way that, in addition to the ranges of detection for the various differing modes of operation, it includes at least one additional range of detection for a switching signal which differs from the switching signals in the operating positions of the operating switch.

Whereas the detector of the known device according to the German specification No. DE OS 2,944,224 only includes a number of ranges of detection which corresponds to the number of possible modes of operation or operating positions of the operating switch the number of detection ranges of the detector according to the present invention is increased. Furthermore, the invention provides for measuring a voltage level on the switching signal transmission path, lies outside the ranges of detection of the voltage levels adjusted in desired modes of operation. Thus the programming unit with the detector can clearly distinguish abnormal from normal operation and then release appropriate control signals which for example can switch off the entire system.

BRIEF DESCRIPTION OF THE DRAWINGS

The invention and its advantages developments are described below in detail by way of the embodiments shown in the accompanying drawing, in which.

DETAILED DESCRIPTION OF A PREFERRED EMBODIMENT

Figure 1:
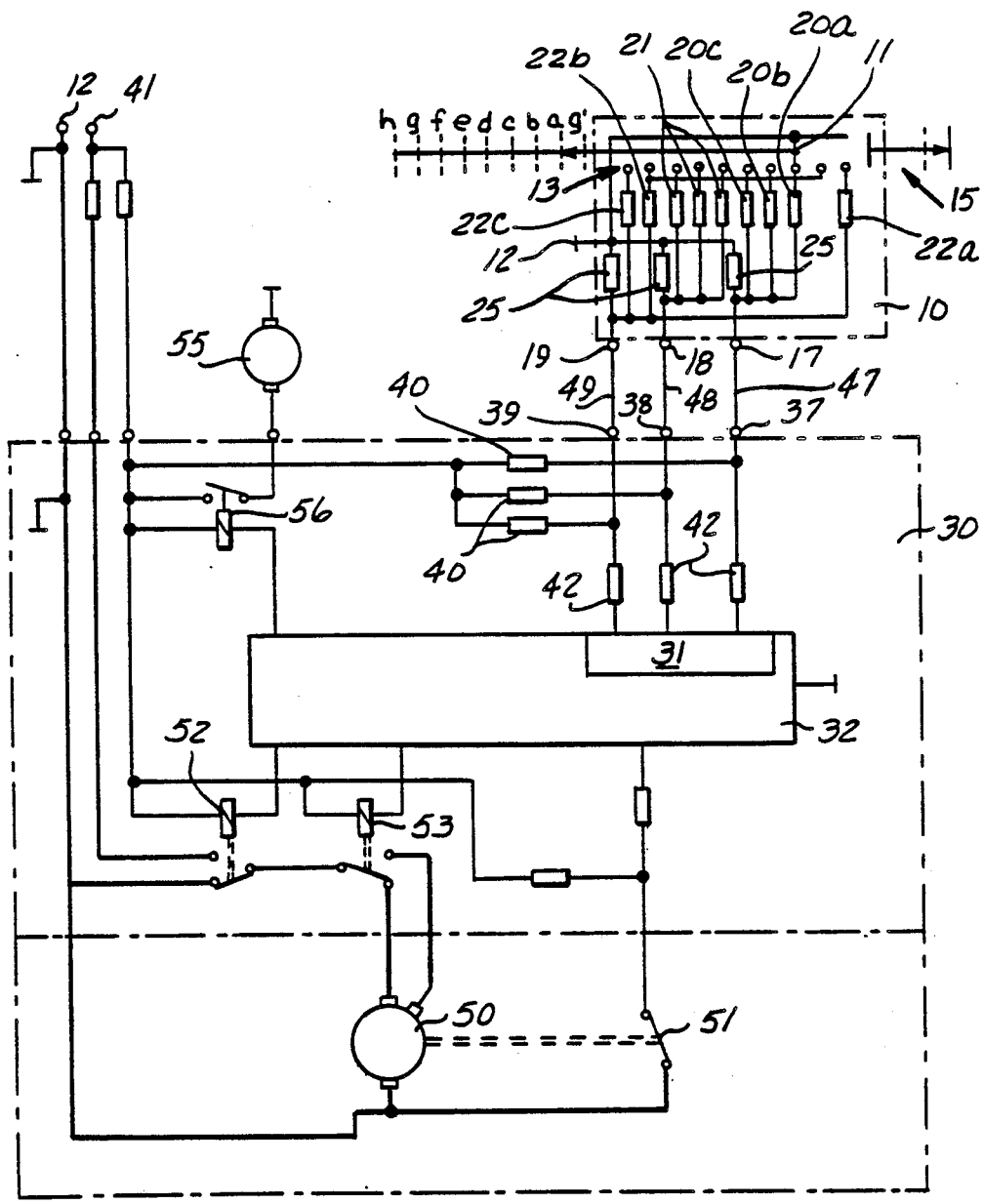
FIG. 1 is a circuit diagram of a first circuit arrangement for a windshield cleaning system.

FIG. 1 shows the circuit diagram for a windshield cleaning system of a motor vehicle. Part of this circuit arrangement is an operating switch 10 with a mechanically adjustable contact bridge 11 for determining different modes of operation of the windshield cleaning system. This contact bridge 11 is continuously connected with the first pole 12 of a voltage source, not shown in detail, which pole is also connected with the body of the motor vehicle. In the various operating positions a-h the contact bridge 11 effects an electrically conductive connection between the pole 12 of a voltage source and one of the stationary contacts 13. The neutral position of the operating switch 10 is shown in FIG. 1. Upon adjustment of the contact bridge 11 to the left-hand side, as viewed in FIG. 1, into the operating positions b to f intermittent operation of the windshield cleaning system is switched on. Each position represents a different interval time. In the operating position g continuous operation with a low wiper speed is activated and in the operating position h continuous operation with a high wiper speed is activated. In the neutral position a the mode of operation "parking position run" is switch on. This position the wiper runs to its parking position and is switched off thereafter. In addition, an operating position g' is provided to the extreme right-hand side of the neutral position, as shown in the drawing in which position g' the so-called tip-wiping-operation is to be switched on. Only for completeness's sake it is pointed out herein that the operating switch 10 also includes a washer key 15 by way of which a particular mode of operation of the windshield wiper system is switched along with the washer system.

From FIG. 1 it can be seen that several stationary contacts 13 are each connected with the same output 17, 18 or 19 of the operating switch by way of resistors each having different values. Thus in each of the operating positions a, b, c there is effected an electrically conductive connection between one pole 12 of the voltage source and one of the resistors 20a, 20b or 20c with the output 17. In the operating positions d, e, f one of the resistors 21 is accordingly connected to the output 18. In the operating positions g, h one of the resistors 22b, 22c is connected with the output 19 and upon operation of the washer key 15 a resistor 22a is also connected with this output 19. The resistors 20a, 21a and 22a have the same resistance values. However, the three resistors 20a, 20b and 20c connected to one output have different resistance values in approximately a ratio of 1 to 3 to 90.

From the circuit diagram according to FIG. 1 it can also be seen that each of the outputs 17, 18, 19 is connected with the pole 12 of the voltage source by way of an associated resistor 25. The associated output is held on a particular voltage level by way of this resistor 25, when the contact bridge 11 of the operating switch is not in contact with a stationary contact 13.

It can also be seen from the circuit diagram that in the operating positions g or g' the same resistor 22b is connected into the circuit. Thus, these operating positions are of equal value electrically, but differ mechanically in that the contact bridge 11 is locked in the operating position g, but it is not locked in the operating position g'. The contact bridge 11 rather springs back automatically from the operating position g' into the neutral position a. Thus, coded switching signals may be tapped off at the outputs of the operating switch, which switching signals differ with regard to the voltage level as far as the present embodiment is concerned.

Part of the circuit arrangement is a programming unit designated generally as 30 with a detector 31, which responds to differently coded switching signals of the operating switch and determines the associated mode of operation. The detector 31 is integrated in a microprocessor 32 or a custom-designed chip. The three inputs 37, 38 and 39 of the programming unit are each connected with the other pole 41 of the voltage source by way of separate resistors 40. Three protective resistors 42 also provided.

The operating switch 10 is connected with the programming unit 30 by way of three switching signal transmission paths 47, 48 and 49. In the simplest case, electric leads can serve as switching signal transmission paths, however the switching signals of the operating switch might also be transmitted optically or acoustically. Thus, it can be seen from the circuit diagram according to FIG. 1 that the number of switching signal transmission paths is less than the number of possible operating positions of the operating switch. In the embodiment according to FIG. 1 three switching signal transmission paths are provided for a total of nine different modes of operation.

In the circuit diagram according to FIG. 1 the wiper motor of a wiper system forms an electrical load designated 50, to which wiper motor a so-called parking position switch 51 is associated. The wiper motor 50 is alternately connected with one or other pole of a voltage source by way of the relay 52. Another relay 53 determines whether the wiper system is to be operated with the lower or higher wiper speed. This circuit arrangement for controlling the wiper motor 50 is known and, therefore, need not to be described in detail. FIG. 1 furthermore shows a further load 55, namely a washing pump motor controlled by a relay 56. Dependent on the operating position of the operating switch 10 or on the voltage levels at the inputs 37, 38, 39 the programming unit 30 effects the appropriate mode of operation of the load 50 whether the load 55 to be switched on. For this purpose, control signals for the various relays 52, 53, 56 are released at particular points of time in a known manner.

Figure 2:
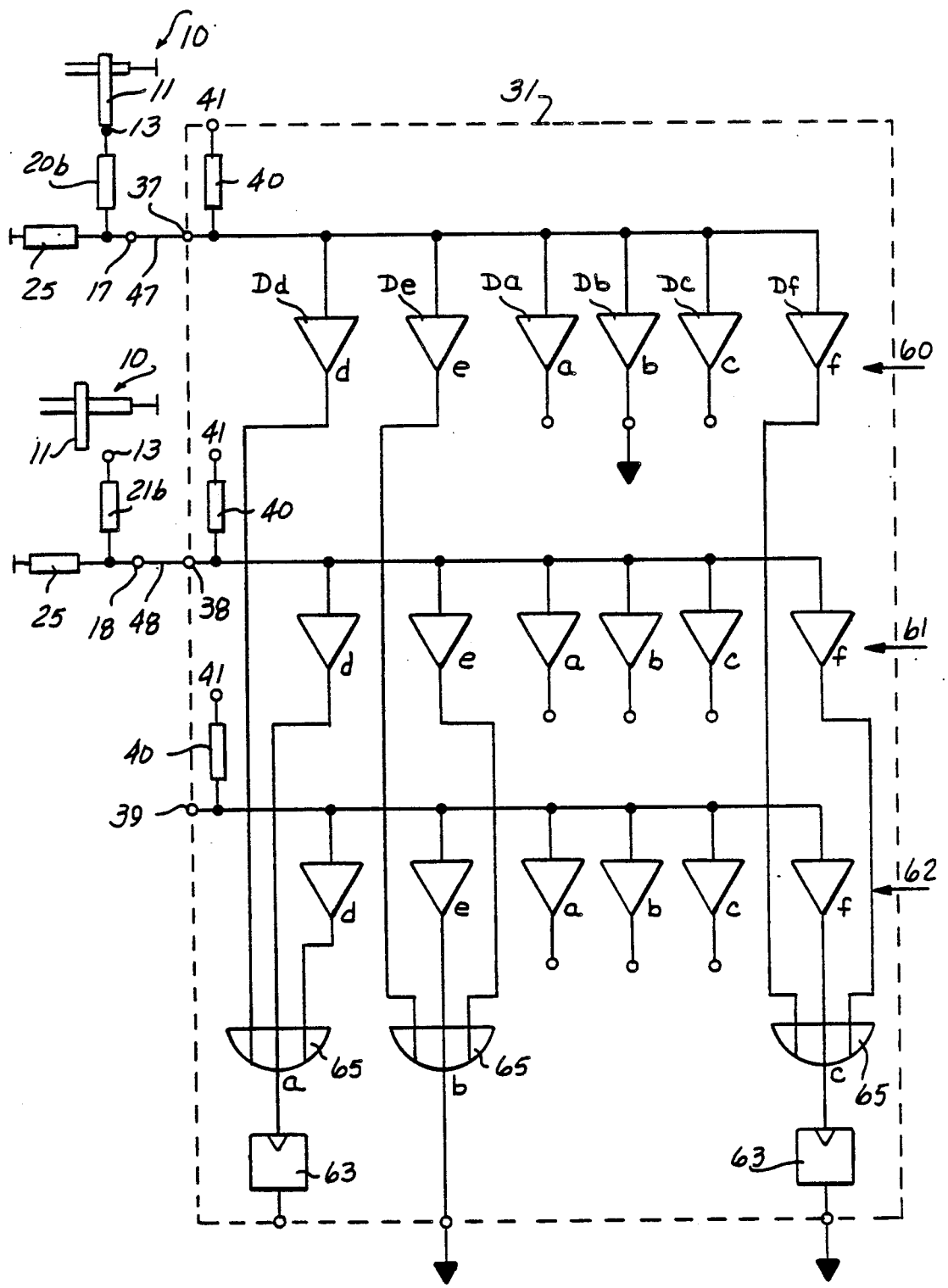
FIG. 2 is a circuit diagram of a detector.

The detector 31, whose circuit diagram is shown in FIG. 2, thereby serves to determine the modes of operation. The detector includes several comparators 60, 61 or 62. The comparators 60a, 60b, 60c, 60d, 60e and 60f are all connected to the input 37 and thus are controlled by the voltage level on the switching signal transmission path 47 or on the output 17 of the operating switch 10, respectively. The comparators 61 are all connected with the input 38 and the comparators 62 with the input 39. Each of these comparators acts in a given range of detection. For example, a signal may be measured at the output of the comparator 60d, when the voltage level at the input 37 lies in the range of 0 volt or a ratio of 0% of the voltage of the voltage source. The comparator 60e responds when the voltage level lies in the ratio of 20% of the supply voltage. Correspondingly, the comparators 60a, 60b, 60c and 60f release a switching signal, if the voltage level lies in the range of 40%, 60%, 80%, 100% of the supply voltage. The same applies for the comparators 61 and 62. These type of signal-recognition comparators are also designated window discriminators.

In the circuit diagram according to FIG. 2 the operating switch 10 has also been indicated. Two different operating positions of the contact bridge 11 can be seen therein which, of course, cannot be simultaneously switch on. When the contact bridge 11 rests upon one of the stationary contacts 13, a voltage level is to be measured at the input 37 of the programming unit 30 in such a way that one of the comparators 60a, 60b and 60c responds. This is achieved by an appropriate dimensioning of the resistors 20, 25 and 40. Thus, in the operating position a, the comparator 60a is to respond, in the operating position b, the comparator 60b and in the operating position c, the comparator 60c. The respective mode of operation, in the present case the interval time during intermittent operation, is then determined by the outputs of these comparators. Thus one can see from FIG. 2 that the detector 31 has three ranges of detection Da, Db, Dc, which are associated with particular modes of operation which may be predetermined by way of the assigned operating switch and the switching signal transmission path 47 respectively. It is essential for the present invention that, in addition to the ranges of detection associated with the various modes of operation, the detector has three further ranges of detection Dd, De, Df which respond to switching signals not representative of any desired mode of operation.

If the contact bridge 11 is located between two operating positions, thus between the operating positions e and f, the voltage divider at the input 38 changes, because now none of the resistors 20, 21 or 22 associated with the stationary contact 13 is connected to the circuit. Thus, in this case, none of the comparators 61a, 61b, 61c associated with the various modes of operation respond, but rather the comparator 61e is to respond. Thus, the detector 31 has a first additional range of detection De for a switching signal or a voltage level at its input, which signal or voltage level differs from the customary switching signals or voltage levels in the operating positions of the operating switch 10. This additional first range of detection comprises switching signals having a voltage level of about 20% of the supply voltage.

Troubles can also appear in a circuit arrngement of this kind, because the switching signal transmission path to an input 39 might be interrupted. Thus, in his case, the full positive supply voltage will be connected to the input by way of the resistor 40 and, consequently, the comparator 62f will respond. Thus, the detector 31 has a second additional range of detection Df for a voltage level differing from the normal voltage levels in one of the modes of operation. Theoretically, it could also happen that the switching signal transmission path be directly connected with the positive pole of the voltage source. Also, in this case, the full supply voltage is connected to the input 39 and the comparator 62f is again to respond. Thus, this second additional range of detection Df of the detector 31 serves to detect two faulty conditions.

However, a short-circuit with regard to the negative pole of the voltage source will appear more often. In that case no voltage is switched onto the input 39 and the comparator 60d responds. Thus, there is obtained a further additional range of detection Dd laid for recognizing another trouble situation.

Thus, the number of the ranges of detection of the detector is greater than the number of the different modes of operation provided. In the embodiment represented in the drawing there are three ranges of detection for each switching signal transmission path in predetermined modes of operation and three additional ranges of detection. In two additional ranges of detection Dd, Df troubles are detected, namely an open switching signal transmission path or short-circuits with the positive or negative poles of the voltage source. In a further additional range of detection De it is detected whether the contact bridge is positioned between two operating positions. This applies to each switching signal transmission path of the preferred embodiment, wherein the output signals of equally acting comparators are interrelated by means of an OR-gate 65a, b, c. The output signal of these OR-gates can be used for a control in different ways. In a case of trouble, for example when there is a short-circuit or the switching signal transmission path is open, the entire system can be switched off in a delayed manner by a timing element 63. A signal appears at the output of the OR-gate 65b when the switch contact 11 is located between two operating positions. In this situation the current mode of operation is to be retained, so long as the duration of the switching signal does not exceed a given time. If the switching signal with a voltage level corresponding to the range of detection detected by the comparator 20e, 21e, 22e is longer than a predetermined time, the switch will most likely be defective and the system can be switched off.

In the embodiment according to FIGS. 1 and 2 six different voltage levels may be transmitted on each switching signal transmission path and monitored by the following comparators. Three of the comparators are associated with the normal modes of operation, whereas three further comparators are associated with the additional ranges of detection.

Figure 3:
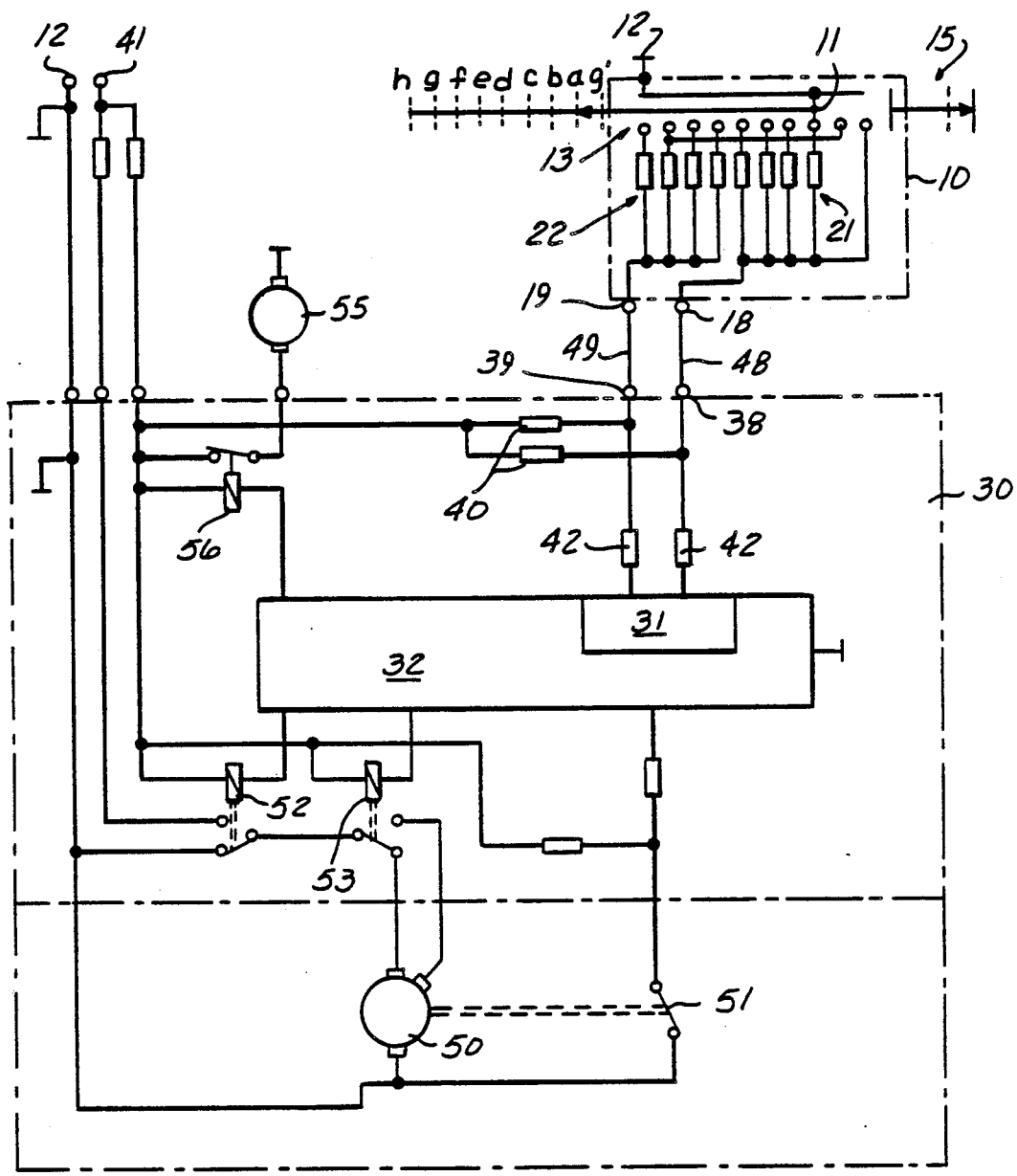
FIG. 3 is a circuit diagram of a second embodiment of a circuit arrangement for a windshield cleaning system and FIG. 4 is a circuit diagram of a third embodiment of a circuit arrangement for a windshield cleaning system.

In the embodiment according to FIG. 3 there are also on each switching signal transmission path six different voltage levels to be transmitted and monitored by comparators, however, in order to minimize switching signal transmission paths, four different voltage levels are associated with different modes of operation, whereas only two other voltage levels lie within the additional ranges of detection. This can be seen from the drawing by the fact that four each of the stationary contacts 13 are connected with an output 18 or 19 by way of associated resistors 21, 22. These resistors are selected in such a way that in the predetermined modes of operation 20%, 40%, 60% or 80% of the supply voltage are applied to the input 38 or 39 of the programming unit 30. Thus, in this embodiment only two additional ranges of detection Dd, Df for voltage levels of 0% or 100% of the supply voltage are possible. In this embodiment the resistors 25 by way of which the voltage level of the embodiment according to FIG. 1 is determined when the switch is open are not used. Consequently, the same voltage level may be measured in the embodiment according to FIG. 3 when the contact bridge 11 is positioned between two operating positions or when the switching signal transmission path 48, 49 is interrupted or short-circuited with the positive pole 41 of the voltage source. It is however possible to distinguish the two conditions easily, because, during the changeover of the operating switch, this signal is only applied for a short time, but it can be measured over a longer period of time for example when the lead is interrupted or when there is a short-circuit. Consequently, this programming unit will be designed in such a way that the duration of a switching signal lying within this additional range of detection Df is also evaluated and different control signals are released in dependence on the duration. If this switching signal is only applied for a relatively short time, the current mode of operating is retained. However, the system is switched off with a longer duration of a switching pulse within this additional range of detection Df.

Furthermore one can see from FIG. 3 that, upon actuation of the washer key 15, a voltage level may be measured at the output 18, which voltage level corresponds to the voltage level in the case of a short-circuit with one pole 12. Because it can be assumed that the washing pump motor 5 is only controlled for a short time by this washer key, the same principle of additionally monitoring the duration of the switching signal can be applied. If the switching signal within this additional range of detection Dd provided for a short-circuit lasts only for a short time, the mode of operation "washing" will be switched on. If, in contrast thereto, the duration is long, the system will be switched off.

Thus, in addition to the ranges of detection for the various different modes of operation, the detector of the embodiment according to FIG. 3 has two additional ranges of detection for switching signals differing from switching signals in the operating positions of the operating switch. Thus, operational reliability is also ensured for this embodiment. In addition, this embodiment also has the advantage of a low number of leads required between the operating switch and the programming unit.

Figure 4:
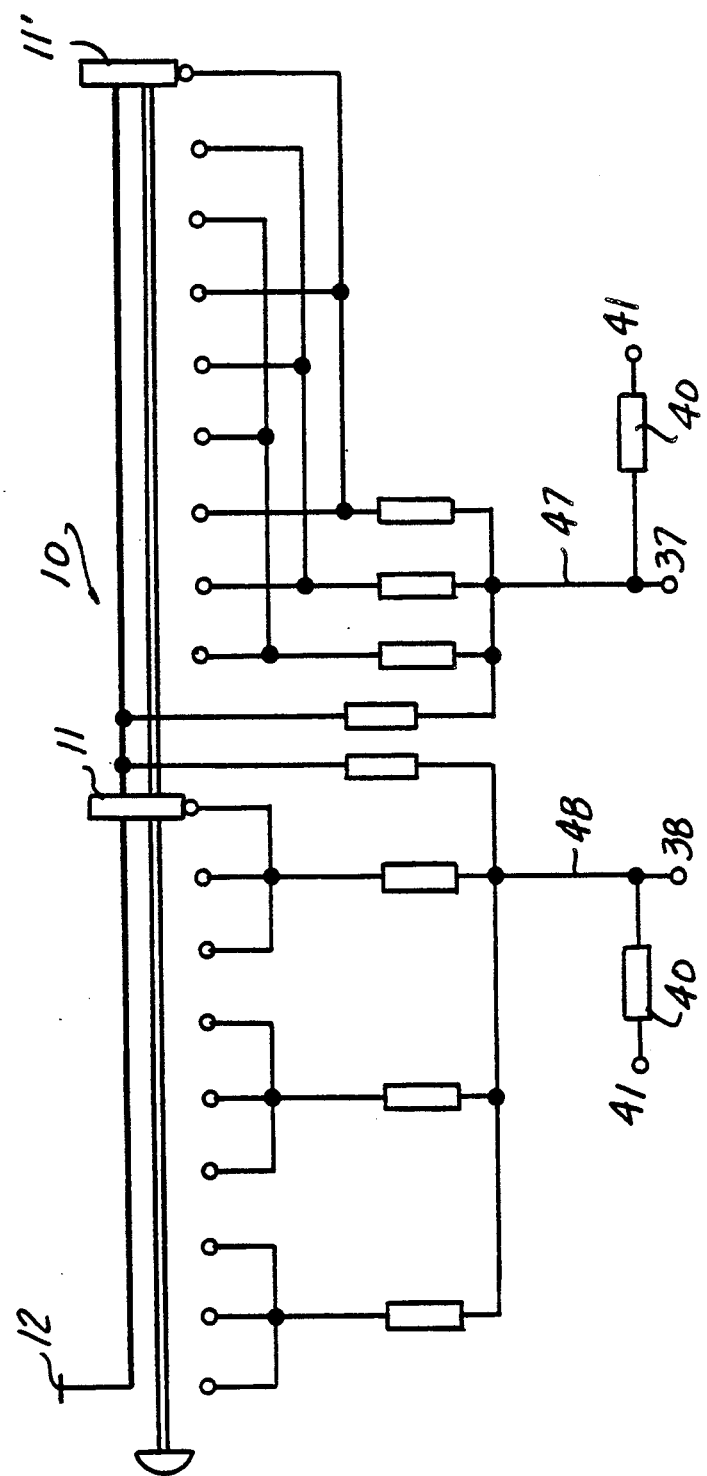

In the embodiment of FIG. 4 the operating switch 10 has two contact bridges 11 and 11' which are jointly adjusted and which thereafter switch different voltage levels onto the two switching signal transmission paths 47 and 48 by way of resistors. The resistors associated with the switch can be selected in such a way that, starting from the rest position shown, with an adjustment to the left-hand side, as viewed in FIG. 4 voltage levels of 40%, 40% 40%, 60%, 60%, 50%, 80%, 80% and 80% of the supply voltage are successively switched onto the switching signal transmission path 48, whereas at the same time voltage levels of 40%, 60% 80%, 40%, 40%, 80%, 40%, 60%, 80% of the supply voltage are switched onto the switching signal transmission path 47 by way of the contact bridge 11'. Upon transition from one operating position into the successive one, a voltage level of 20% of the supply voltage may be measured on both switching signal transmission paths.

Due to the voltage level at its inputs 37, 38, the detector determines the mode of operation for a load. If a voltage level of 40%, is available on one input 38 and at the other input 37 a voltage level of 40% intermittent operation is, for example, to be switched on. If, however, at both inputs 37 and 38 a voltage level of 80% of the supply voltage is applied, continuous operation with high wiper speed is to be switched on. The detector thus detects the mode of operation from several simultaneously applied voltage levels whose level depends on the operating position of the operating switch.

Thus, this embodiment clearly shows that nine different modes of operation or operating positions of the operating switch and further additional switching signals representing system troubles can be recognized with only two switching signal transmission paths.

This design is especially favourable in regard to costs and can be effected with a small number of switching signal transmission paths for a plurality of predetermined modes of operation, even if faulty conditions are not to be evaluated.

The present invention has been described by way of an embodiments relating to a windshield wiper system for motor vehicles. Of course, the basic ideas can also be applied for the control of other electrical loads in a motor vehicle. However, in each one of the embodiments described there are provided several leads between the operating switch and the programming unit. Thus, the principle of the invention is also applicable, if all switching signals of the operating switch are to be transmitted over a single lead. The principle of the invention has been illustrated by way of examples in which the switching signals distinguish by different voltage levels. However, the basic idea can also be advantageously used, if the switching signals differ in other criteria, for example with regard to frequency or pulse duration. Even if the switching signals released by the operating switch have a digital coding the basic idea of the invention can be realized, although in this case, e.g., with the use of a Gray code the problem of a non-defined switching signal during a changeover of the operating switch from one position to the other does not appear. In the embodiments described the contact bridge of the operating switch always has one side connected to ground and thus to that pole of the voltage source to which the body of the motor vehicle is connected. Thus, the contact bridge might in principle also be connected with the positive pole of the voltage source, but in that case the resistors with a relatively low resistance in the operating switch would have to endure a relatively high power dissipation when a short-circuit of the switching signal transmission path to ground occurs.

Finally it is also pointed out that the control signals released in the cases of trouble can be evaluated quite differently. Either the entire system can be switched off or only that switching signal transmission path on which the switching signal characterizing a trouble has been measured can be interrupted. Of course, a trouble might also be indicated acoustically or optically in order to leave it to the user's decision how to react to a particular trouble.

In order to ensure that, in this analogous processing of measured values voltage swings do not affect the measured result, in most cases a stabilized voltage source will be used or the resistors will be supplied with a constant current. However, in a particularly simple example, the resistors and the comparators may also be directly connected with the battery of the motor vehicle. Upon voltage swings, both the voltage level to be evaluated and the range of detection of a comparator change without adverse effects upon the evaluation, insofar as these ranges of detection differ sufficiently from each other.

The entire system is preferably be built up in integrated manner, by using appropriately programmed microprocessors or microcomputers or custom-designed chips.

What is claimed is:

1. A circuit arrangement for at least one electric accessory load of a motor vehicle of the type for a windshield cleaning system, comprising an operating switch switchable into several different operating positions in order to determine different modes of operation, means for programming including detector means for responding to different switching signals from the operating switch and, said detector means determining an associated mode of operation of the load when the switching signal lies within a particular range of detection, a plurality of switching signal transmission paths between the operating switch and said detector means, the number of signal transmission paths being less than the number of possible operating positions of the operating switch wherein, in addition to the ranges of detection for detecting the various modes of operation, the detector means includes at least one additional range of detection for detecting a switching signal which differs from the switching signal in each of the different operating positions of the switch and wherein said operating switch includes a contact bridge interconnected with said means for programming.

2. The circuit arrangement according to claim 1 wherein said detector means detects different operating voltage levels on at least one of said switching signal transmission paths in the various operating positions, each operating voltage level representing an assigned range of detection of the detector.

3. The circuit arrangement according to claim 2 wherein during changeover of the operating switch from one operating position into a different operating position, a first signal voltage level is switched onto the switching signal transmission path, said first signal voltage level differs from the operating voltage levels in each of the operating positions, said first signal voltage level representing a first additional range of detection.

4. The circuit arrangement according to claim 3 wherein said detector means retains the mode of operation defined by said one operating position for a defined period of time when said first signal voltage is within said first additional range of detection.

5. A circuit arrangement for at least one electric accessory load of a motor vehicle of the type for a windshield cleaning system, comprising an operating switch switchable into several different operating positions in order to determine different modes of operation, a programming unit including detector means for responding to different switching signals from the operating switch and, said detector means determining an associated mode of operation of the load when the switching signal lies within a particular range of detection, a number of switching signal transmission paths between the operating switch and said detector means, the number of signal transmission paths being less than the number of possible operating positions of the operating switch wherein, in addition to the ranges of detection for detecting the various modes of operation, the detector means includes at least one additional range of detection for detecting a switching signal which differs from the switching signal in each of the different operating positions of the operating switch, wherein said detector means detects different operating voltage levels on at least one of said switching signal transmission paths in the various operating positions, each operating voltage level representing an assigned range of detection of the detector, wherein during changeover of the operating position, a first signal voltage level is switched onto the switching signal transmission path, said first signal voltage level differs from the operating voltage levels in each of the operating positions, said first signal voltage level representing a first additional range of detection, and wherein upon a short-circuit of a signal transmission path with one pole of a voltage source for the load, a second signal voltage level is applied to the switching signal transmission path, said second signal voltage differs from the operating voltage levels in each of the operating positions, said second signal voltage level is associated with at least a second additional range of detection.

6. The circuit arrangement according to claim 5 wherein upon a short-circuit of a switching signal transmission path with the positive pole of the voltage source the second signal voltage level lies within the second additional range of detection, and upon a short-circuit with the negative pole of the voltage source the second signal voltage level lies within a third additional range of detection.

7. The circuit arrangement according to claim 6 wherein when the switching signal transmission path is interrupted, a third signal voltage level different from the operating voltage levels in the operating positions is applied to the switching signal transmission path said third signal voltage level is associated with a fourth additional range of detection.

8. The circuit arrangement according to claim 7 wherein the second additional range of detection provided for the short-circuit is equal to the fourth additional range of detection for the third signal voltage level available with interrupted switching signal transmission path.

9. The circuit arrangement according to claim 6 including means for switching off the voltage source to all loads upon detection of the second signal voltage corresponding to the second or third range of detection.

10. The circuit arrangement according to claim 6 including means for switching off at least one mode of operation of at least one load upon detection of the second signal voltage within the second or third additional range of detection.

11. A circuit arrangement for at least one electric accessory load of a motor vehicle of the type for a windshield cleaning system, comprising an operating switch switchable into several different operating position sin order to determine different modes of operation, a programming unit including detector means for responding to different switching signals from the operating switch and, said detector means determining an associated mode of operation of the load when the switching signal lies within a particular range of detection, a number of switching signal transmission paths between the operating switch and said detector means, the number of signal transmission paths being less than the number of possible operating positions of the operating switch wherein, in addition to the ranges of detection for detecting the various modes of operation, the detector means includes at least one additional range of detection for detecting a switching signal which differs form the switching signal in each of the different operating positions of the operating switch, wherein the operating switch has a contact bridge which changes over into different operating positions, said contact bridge connected with a first pole of a voltage source and, in each of the different operating positions, rests upon one of a plurality of stationary contacts, each of said plurality of stationary contacts connected with one output of the operating switch byway of first resistors, each first resistor having a different resistance value, an output from each of the first resistors connected with separate inputs to the programming unit by way of a switching signal transmission path, each input to the programming unit connected with a second pole of the voltage source by way of second resistors, and wherein the outputs of the operating switch are each connected with the first pole by way of a third resistor.

12. The circuit arrangement according to claim 11 wherein the resistance values of the various resistors are provided such that upon a short-circuit of a switching signal transmission path with the first pole of the voltage source a voltage level of 0% relative to the voltage source may be measured at the input of the programming unit, upon a short-circuit with the second pole of a voltage source, a voltage level of 100% relative to the voltage source, during changeover from one operating position into another, a voltage level of 20% relative to the voltage source and in the operating positions a voltage level greater than 20% and smaller than 100% relative to the voltage source.

13. The circuit arrangement according to claim 11 wherein the first pole of the voltage source is also connected to the body of the motor vehicle.

14. The circuit arrangement according to claim 11 wherein the detector also evaluates the duration of at least one signal voltage lying within at least one additional range of detection and, in dependence on the duration, generates different control signals.

15. The circuit arrangement according to claim 14 wherein during changeover of the operating switch from one operating position into another position and when the switching signal transmission path is interrupted, a first signal voltage level differing from the operating voltage levels in the operating positions is detected, said first signal voltage level is associated with a first additional range of detection, the mode of operation being retained for a first signal voltage duration lasting less than a predetermined time and said mode of operation switched off for a first signal voltage duration lasting longer than said predetermined time.

16. The circuit arrangement according to claim 15 wherein a second signal voltage level occurring during a short-circuit of the switching signal transmission path with one pole of the voltage source corresponds to a voltage level occurring during switching-on of a particular load, said second signal voltage level is associated with all electric loads being retained for a duration of the second signal voltage level less than a predetermined time and all loads being switched off for a duration of said second signal voltage level lasting longer than said predetermined time.

17. The circuit arrangement according to claim 11 wherein the operating switch has a plurality of contact bridges adapted to switch which different voltage levels onto a plurality of switching signal transmission paths, said detector determining a particular mode of operation of said load from said different voltage levels, said voltage levels being simultaneously measured.

* * * * *